(12) United States Patent
Iwasaki et al.

(10) Patent No.: US 9,768,612 B2
(45) Date of Patent: Sep. 19, 2017

(54) POWER SUPPLY SYSTEM

(75) Inventors: Toshiya Iwasaki, Osaka (JP); Yasuo Okuda, Kyoto (JP); Souichi Sakai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 861 days.

(21) Appl. No.: 13/820,268

(22) PCT Filed: Oct. 6, 2011

(86) PCT No.: PCT/JP2011/073042
§ 371 (c)(1),
(2), (4) Date: Mar. 1, 2013

(87) PCT Pub. No.: WO2012/050032
PCT Pub. Date: Apr. 19, 2012

(65) Prior Publication Data
US 2013/0193768 A1    Aug. 1, 2013

(30) Foreign Application Priority Data

Oct. 15, 2010    (JP) .................................. 2010-232863

(51) Int. Cl.
*H02J 1/10*    (2006.01)
*H02J 3/32*    (2006.01)
(Continued)

(52) U.S. Cl.
CPC ........ *H02J 1/10* (2013.01); *H02J 3/32* (2013.01); *H02J 7/35* (2013.01); *H01M 2010/4271* (2013.01); *Y10T 307/724* (2015.04)

(58) Field of Classification Search
CPC ...... H01M 10/44; H01M 10/42; H01M 10/48; H01M 10/46; H02J 7/00
(Continued)

(56) References Cited

U.S. PATENT DOCUMENTS 6,184,656 B1 *    2/2001    Karunasiri et al. ........... 320/119
2009/0066291 A1 *    3/2009    Tien ...................... H02J 7/0016
                                                                        320/118

(Continued)

FOREIGN PATENT DOCUMENTS

CN        101043143 A        9/2007
CN        101091299 A        12/2007
(Continued)

OTHER PUBLICATIONS

Extended European Search Report for the international patent application No. 11832467.2-1806, dated May 26, 2014.
(Continued)

*Primary Examiner* — Thienvu Tran
*Assistant Examiner* — David M Stables
(74) *Attorney, Agent, or Firm* — Cantor Colburn LLP (57) ABSTRACT

To provide a power supply system equipped with a storage battery assembly including a plurality of storage battery control units, the power supply system being configured such that a group of the storage battery control units, which are selected from the storage battery control units, and which have output voltages within a predetermined voltage range, are first connected to the parallel connection line, and such that the voltage range is set so as to maximize the number of the storage battery control units having output voltages within the voltage range.

7 Claims, 8 Drawing Sheets

(51) Int. Cl.
*H02J 7/35* (2006.01)
*H01M 10/42* (2006.01)

(58) Field of Classification Search
USPC .............................................................. 307/85
See application file for complete search history.

(56) References Cited

U.S. PATENT DOCUMENTS

| | | | |
|---|---|---|---|
| 2009/0072793 A1* | 3/2009 | Chang et al. ................. | 320/134 |
| 2009/0160259 A1* | 6/2009 | Naiknaware et al. .......... | 307/82 |
| 2009/0251100 A1* | 10/2009 | Incledon et al. .............. | 320/106 |
| 2009/0296442 A1* | 12/2009 | Chang et al. ................. | 363/142 |
| 2010/0001737 A1* | 1/2010 | Kubo ...................... | B60L 11/18 |
| | | | 324/434 |
| 2011/0234006 A1* | 9/2011 | Deng ................. | H01M 10/441 |
| | | | 307/71 |

FOREIGN PATENT DOCUMENTS

| | | | | |
|---|---|---|---|---|
| EP | 1837944 A2 * | 9/2007 | ............ | H01M 10/44 |
| JP | 2003059541 A | 2/2003 | | |
| JP | 2008-226511 A | 9/2008 | | |
| JP | 2009-33936 A | 2/2009 | | |
| WO | 2006112512 A1 | 10/2006 | | |
| WO | 2010/103816 A1 | 9/2010 | | |

OTHER PUBLICATIONS

Sastry, Shivakumar et al., "Coordinated Discharge of a Collection of Batteries" Journal of Power Sources 166 (2007), pp. 284-296.
Ban, Han-Sik et al., "Load Sharing Improvement in Parallel-Operated Lead Acid Batteries", Industrial Electronics, (Jun. 12, 2001) pp. 1026-1031
International Search Report for International Application No. PCT/JP2011/073042, mailed Jan. 10, 2012, with English translation.
Chinese First Office Action regarding Application No. 201180042017.8; Date of Mailing: Jul. 31, 2014.

* cited by examiner

POWER SUPPLY SYSTEM

This is the U.S. national stage of application No. PCT/JP2011/073042, filed on Oct. 6, 2011. Priority under 35 U.S.C. §119(a) and 35 U.S.C. §365(b) is claimed from Japanese Application No. 2010-232863, filed Oct. 15, 2010, the disclosure of which is also incorporated herein by reference.

TECHNICAL FIELD

The present invention generally relates to a power supply system including a storage battery.

BACKGROUND ART

In order to effectively use electric power, a power supply system configured by combining a commercial power supply with a storage battery has begun to come into use. That is, in the power supply system, according to temporal variations of a load, the power supplied from the commercial power supply is temporally averaged in such a manner that, when the load is large, the discharge power from the storage battery is supplied to the load in addition to the power supplied to the load from the commercial power supply, and that, when the load is small, the storage battery is charged by supplying power from the commercial power supply to the storage battery. Further, a solar power generation system and a fuel cell system, which have been developed in recent years, are also combined with the power supply system.

SUMMARY OF INVENTION

Technical Problem

In such power supply system, when multiple storage battery units are connected in parallel so as to be charged and discharged, and when the output voltages of the respective storage batteries are different from each other, power exchange is performed between the storage batteries. At this time, when the difference between the output voltages of the respective storage batteries is large, large charging and discharging currents flow between the storage batteries between which the output voltage difference is large. This may result in problems such as shortening the life of the storage battery.

Further, when the required charging and discharging power is large, it is desired that as many storage batteries as possible be connected to the power supply system so that the charging and discharging can be performed depending on the required power. On the other hand, when there is a difference between the charged states of the storage batteries included in the power supply system, it is desired that the charged states of the storage batteries be made uniform as quickly as possible.

Solution to Problem

The present invention provides a power supply system provided with a storage battery assembly including a plurality of storage battery control units each of which includes at least one storage battery cell and each of which is connected to a common parallel connection line via a selection switch circuit, the power supply system being configured such that a group of the storage battery control units, which are selected from the storage battery control units and which have output voltages within a predetermined voltage range, is first connected to the parallel connection line, and such that the voltage range is set so as to maximize the number of the storage battery control units having output voltages within the voltage range.

Advantageous Effect of Invention

The present invention provides a power supply system which can prevent performance deterioration due to charging and discharging between the storage batteries, and which can also perform effective charging and discharging.

MODE FOR CARRYING OUT THE INVENTION

Figure 1:
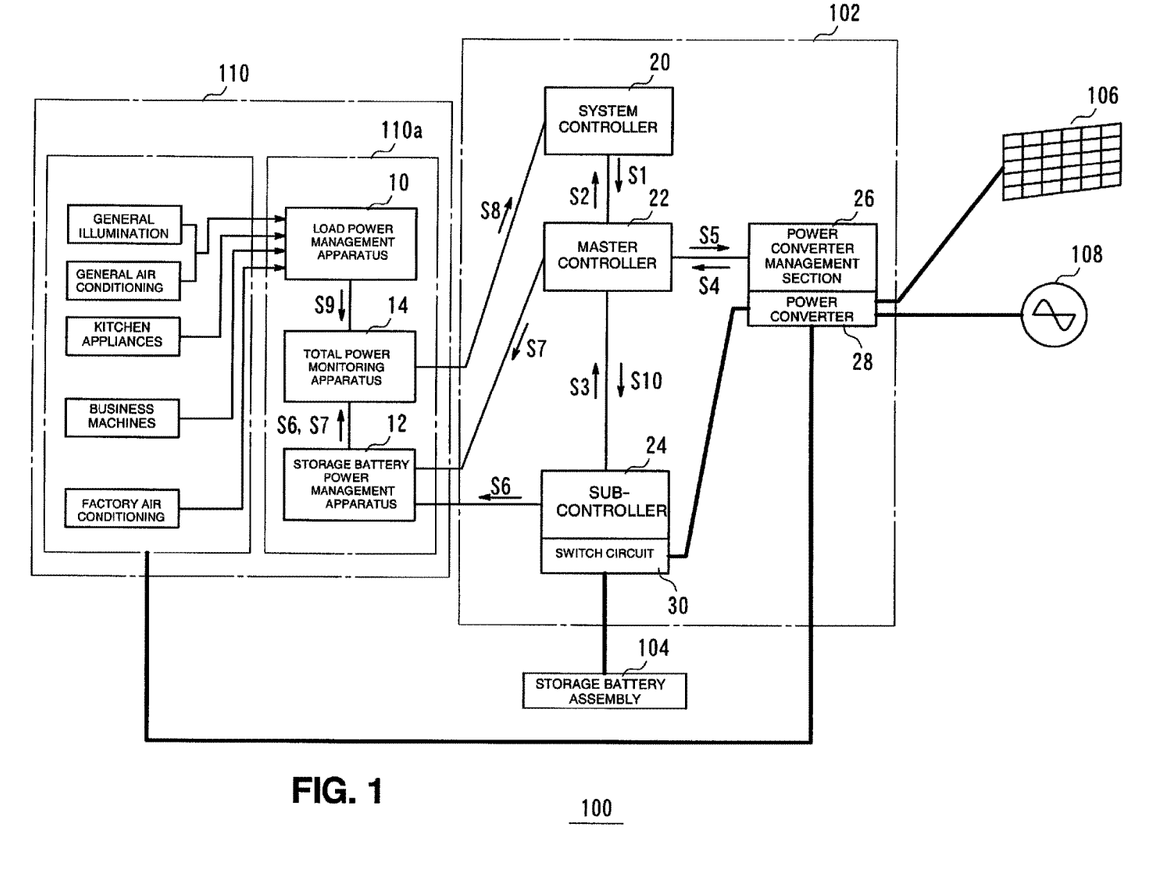
FIG. 1 is a view showing the entire configuration of a power supply system in an embodiment of the present invention.

As shown in FIG. 1, a power supply system 100 in an embodiment of the present invention is configured by including a power supply management system 102, a storage battery assembly 104, a solar battery system 106, and a system power supply 108. The power supply system 100 is used for supplying power to a load 110. Note that, in FIG. 1, the thick solid lines represent the flow of power, and the thin solid lines represent the flow of signals.

In the present embodiment, the solar battery system 106 and the system power supply 108 are used as power sources. The system power supply 108 is a single phase power supply, a three phase power supply, or the like, which is supplied from an external electric power company by combining power generated by various power generation systems, such as a hydraulic power generation system, a nuclear power generation system, and a thermal power generation system. Further, for example, a large scale solar power generation system with an output power of one MW is used as the solar battery system 106. However, the system power supply 108 is not limited to these, and may include other power sources, such as a fuel cell and a wind power generation system.

Figure 2:
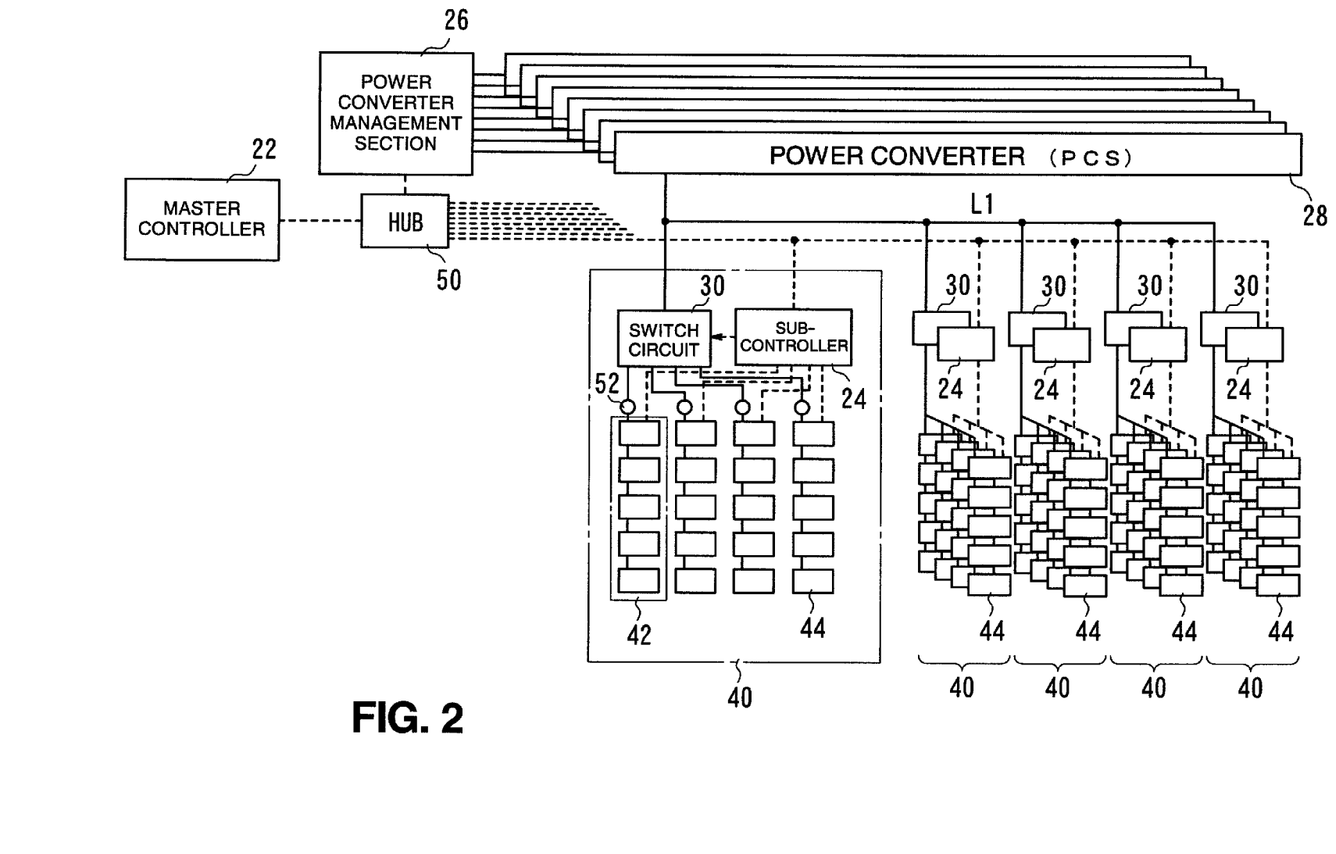
FIG. 2 is a view showing the configuration of the power supply system in the embodiment of the present invention.
Figure 3:
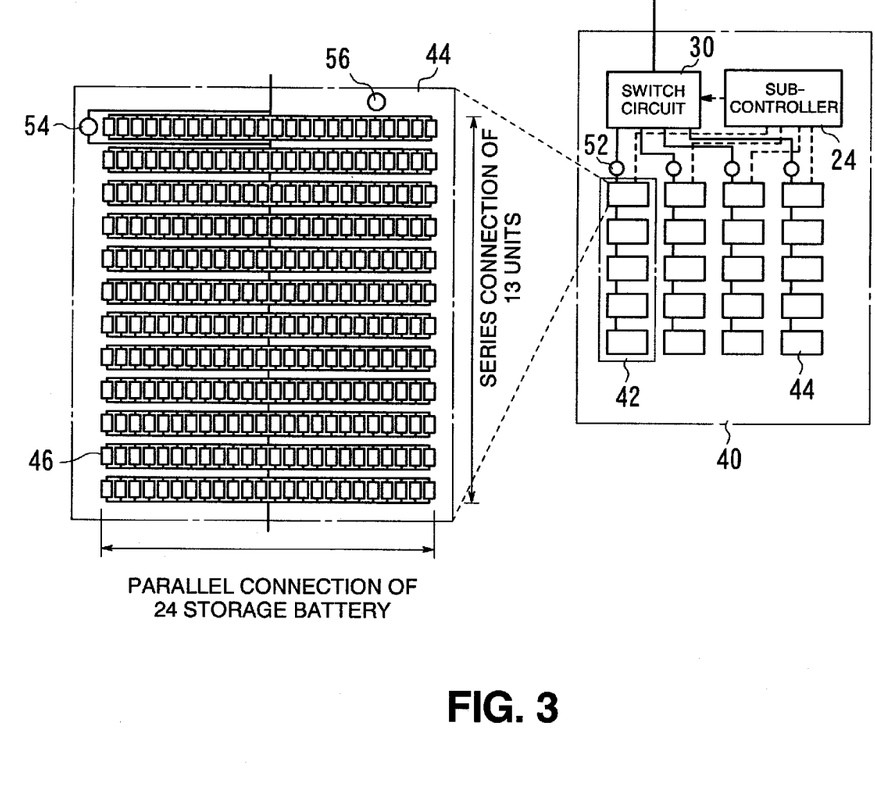
FIG. 3 is a view showing the configuration of a storage battery unit in the embodiment of the present invention.

The storage battery assembly 104 is provided to supply power according to power required by the load 110. As shown in FIG. 2 and FIG. 3, the storage battery assembly 104 is hierarchically configured by storage battery packs 44 each formed by combining a plurality of storage battery cells 46, storage battery control units 42 each formed by combining a plurality of the storage battery packs 44, and storage battery units 40 each formed by combining a plurality of the storage battery control units 42.

Specifically, the storage battery assembly 104 is configured as follows. As shown in FIG. 2, in the present embodiment, eight power converters 28 are provided, and the storage battery assembly 104 is divided into eight segments, each having one of the power converters 28 assigned for power management. Five storage battery units 40 are assigned to each of the power converters 28. That is, a total of 40 of the storage battery units 40 are provided, and one set of the five storage battery units 40 is connected to each of the power converters 28. Note that, in FIG. 2, each of power lines is represented by the solid line, and each of signal lines is represented by the broken line. A signal line is connected between a master controller 22 and a power converter management section 26 via a HUB 50, and a signal line is connected between the master controller 22 and each of sub-controllers 24 via the HUB 50.

FIG. 3 is a view showing in detail a configuration of one storage battery unit 40 extracted from FIG. 2. One storage battery unit 40 is configured, as required, by connecting in parallel the storage battery control units (battery pack arrays) 42, each of which is formed by connecting the storage battery packs 44 in series as required. In the example of FIG. 3, one storage battery control unit 42 is formed by connecting in series five of the storage battery packs 44, and one storage battery unit 40 is configured by connecting in parallel four of the storage battery control units 42. In the present embodiment, one storage battery unit 40 is configured by twenty of the storage battery packs 44.

Further, in FIG. 3, the internal configuration of one storage battery pack 44 is enlarged and shown. In the present embodiment, one storage battery pack 44 is configured by connecting in series thirteen sets, each of which is configured by connecting in parallel twenty-four storage battery cells 46 each serving as a storage battery unit. That is, each of the storage battery packs 44 is configured by 24×13=312 storage battery cells 46.

Figure 4:
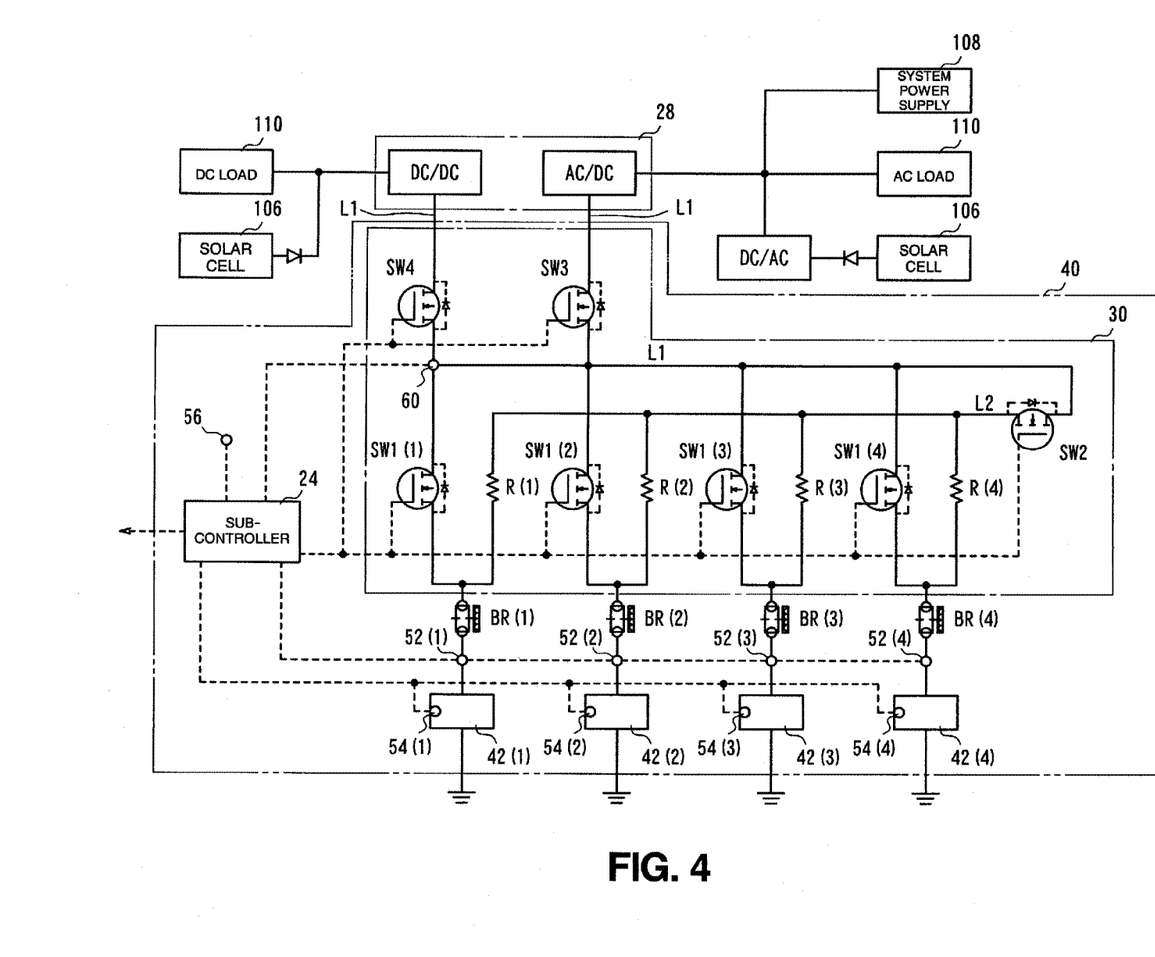
FIG. 4 is a view showing the configuration of the storage battery unit in the embodiment of the present invention.

In each of the storage battery units 40, one sub-controller 24 and one switch circuit 30 are provided. As shown in FIG. 4, in the switch circuit 30, one selection switch SW1 is provided for each of the storage battery control units 42. Each of the storage battery control units 42 is connected to a parallel connection line L1 via the selection switch SW1. The selection switch SW1 is controlled to be opened and closed according to an opening/closing control signal from the sub-controller 24. That is, the storage battery control unit 42 is used as a minimum control unit at the time when the storage battery is connected to the parallel connection line L1.

Further, as shown in FIG. 4, the storage battery control units 42 (42(1) to 42(4)) included in one storage battery unit 40 are connected to a charging and discharging line L2 respectively via resistors R (R(1) to R(4)). Thereby, charging and discharging currents are made to flow between the storage battery control units 42 (42(1) to 42(4)) via the resistors R (R(1) to R(4)), so that the charged states of the storage battery control units 42 (42(1) to 42(4)) are made uniform. Preferably, each of the resistors R (R(1) to R(4)) has such a resistance value that a large current exerting an adverse effect, such as deterioration of the storage battery life, is prevented from flowing between the storage battery control units 42 (42(1) to 42(4)). For example, it is preferred that, when the storage battery cell 46 is configured by a lithium ion battery, and when the output voltage of the storage battery control unit 42 is in the range of about 200 to 250 V, the resistance value of the resistor R is set to several to several hundreds of ohms (Ω). Further, a switch SW2 may be provided to allow charging and discharging to be performed between the storage battery control units 42 (42(1) to 42(4)) via the parallel connection line L1 and the charging and discharging line L2. Note that the storage battery control units 42 (42(1) to 42(4)) are preferably configured to be connected to the parallel connection line L1 and the charging and discharging line L2 respectively via breakers BR (BR(1) to BR(4)). The breaker BR is provided to protect the storage battery control unit 42 by disconnecting the storage battery control unit 42 from the circuit when the charging or discharging current to or from the storage battery control unit 42 exceeds a predetermined interruption reference current value.

Storage battery current sensors 52 are provided in the storage battery unit 40. The storage battery current sensor 52 is provided at each of the storage battery control units 42 and is provided at each of the storage battery packs. The current of each of the storage battery control units 42, and the current of each of the storage battery packs 44 are detected by the storage battery current sensors 52. Further, storage battery voltage sensors 54 are provided in the storage battery unit 40. The storage battery voltage sensor 54 is provided at each of the storage battery control units 42, and at each of the storage battery packs 44. Further, the storage battery voltage sensor 54 is provided at each of the thirteen parallel assemblies, each of which is configured (as a parallel assembly of the storage battery cells 46) by connecting in parallel twenty-four storage battery cells 46, and which are connected in series to form the storage battery pack 44. Thereby, the voltage of each of the storage battery control units 42, the voltage of each of the storage battery packs 44, and the voltage between the terminals of the parallel assemblies each configured by the storage battery cells 46 are detected. Note that, in FIG. 3, in order to simplify the illustration, only one of the storage battery current sensors 52 and only one of the storage battery voltage sensors 54 are depicted. Further, the temperature of the storage battery pack 44 is detected as a pack temperature by a temperature sensor 56. Note that a plurality of the temperature sensors 56 may be provided for each of the storage battery packs 44. The data of these sensors are acquired by the sub-controller 24. The sub-controller 24 outputs, to the master controller 22 and a storage battery power management apparatus 12, these data and the charging and discharging states (SOC: State Of Charge) calculated from these data as unit state data S3 and S6 which represent the state of each of the storage battery units 40. Further, when a trouble is caused in one of the storage battery units 40 configuring the storage battery assembly 104, the sub-controller 24 transmits the information for specifying the storage battery unit 40 having the trouble, by incorporating the information into the unit state data S3 and S6.

Further, the sub-controller 24 receives a switch state signal representing the opened and closed states of the selection switches SW1, the switch SW2, and unit switches SW3 and SW4 which are included in the storage battery unit 40. Then, the sub-controller 24 outputs the information of the switches to the master controller 22 by incorporating the information into the unit state data S3. The switch state signal preferably ensures that the actual opened and closed state of each of the switches can be determined. For example, it is preferred that, when each of the switches is an FET, the switch state signal is obtained by directly detecting the gate voltage of the FET. The use of the switch state signal will be described below.

Note that the number of combinations of the storage battery cells 46, the number of combinations of the storage battery packs 44, the number of combinations of the storage battery control units 42, and the number of combinations of the storage battery units 40 may be suitably changed according to the specification of the power supply system 100. Further, a lithium ion battery can be used as the storage battery, but a secondary battery other than the lithium ion battery may also be applied. For example, a nickel-hydride battery, a nickel-cadmium battery, and a manganese battery may be applied as the storage battery.

The power supply system 100 is provided in order to supply power to the load 110, including loads for general illumination and general air conditioning, and including loads of kitchen appliances, display cases, air conditioners, and the like, in a factory facility.

A power management apparatus 110*a* is provided in the load 110. The power management apparatus 110*a* is configured by including a load power management apparatus 10, the storage battery power management apparatus 12, and a total power monitoring apparatus 14.

The load power management apparatus 10 acquires load side information data S9 representing the necessary power of the load 110. The load side information data S9 includes a total amount of power which is required by the whole load 110, and which is necessary to enable the system controller 20 described below to set a total charge and discharge control command S1. As shown in FIG. 1, when the load 110 is divided into four load systems, the load power management apparatus 10 is internally regarded as an assembly of four load power management apparatuses respectively corresponding to the four load systems.

The storage battery power management apparatus 12 receives the unit state data S6 representing the state of each of the storage battery units 40 included in the storage battery assembly 104, and power converter management data S7 representing the state of each of the power converters 28 included in the power supply system 100. The storage battery power management apparatus 12 transmits these kinds of information to the total power monitoring apparatus 14. The unit state data S6 include the information used for generation of the total charge and discharge control command S1. As described above, the unit state data S6 include the data of voltage, temperature, current, SOC, and the like, of each of the storage batteries configuring the storage battery assembly 104. When a trouble is caused in one of the storage battery units 40 configuring the storage battery assembly 104, the unit state data S6 also include the information representing the trouble. Further, the power converter management data S7 include information which is related to the setting of the total charge and discharge control command S1, and which is related to a trouble of the power converter 28. For example, when a trouble, such as a failure, is caused in one of the power converters 28 included in the storage battery assembly 104, the power converter management data S7 include information for specifying the power converter 28 in which the trouble is caused.

The total power monitoring apparatus 14 receives the load side information data S9 from the load power management apparatus 10, and receives the unit state data S6 and the power converter management data S7 from the storage battery power management apparatus 12. Then, the total power monitoring apparatus 14 extracts data required for charge and discharge control from these kinds of information. The total power monitoring apparatus 14 outputs, as a system management signal S8, the extracted information to the system controller 20. The transmission of the system management signal S8 is performed, for example, in a cycle of once per second.

As shown in FIG. 1, the power supply management system 102 is configured by including the system controller 20, the master controller 22, the sub-controller 24, the power converter management section 26, and the power converter 28. The power supply management system 102 is configured as a hierarchical control system in which the control is hierarchized from top to bottom; that is, hierarchized in the order of the system controller 20, the master controller 22, the sub-controller 24, and the power converter management section 26.

The system controller 20 has a function of integrally performing power management of the power supply system 100. The master controller 22 is a control apparatus which receives the total charge and discharge control command S1 from the system controller 20, to collectively control charge and discharge of the whole storage battery assembly 104. The power converter management section 26 controls the processing of power conversion, voltage conversion, and the like, in each of the power converters 28 included in the power supply system 100. The sub-controller 24 is provided in each of the storage battery units 40 included in the storage battery assembly 104, so as to control the charge and discharge of each of the storage battery units 40. In the following, these components will be described.

The system controller 20 receives the system management signal S8 including the load side information data S9 and the storage battery information signal unit state data S6 from the power management apparatus 110*a*. Then, on the basis of these kinds of information, the system controller 20 generates and outputs the total charge and discharge control command S1, which is a charge and discharge control command for the whole power supply system 100.

Specifically, in consideration of the states of the storage battery units 40 and the power converters 28, the system controller 20 obtains the charge and discharge states satisfying the amount of power required by the whole load 110, from the charge and discharge capacity of the storage battery assembly 104, and transmits, as the total charge and discharge control command S1, the obtained charge and discharge states to the master controller 22. Further, preferably, in consideration of the charge and discharge states of the storage battery units 40 connected to the power converter 28 in which a trouble is caused, and also in consideration of the information about the charge and discharge state of the storage battery unit 40 in which a trouble is caused, the system controller 20 obtains the charge and discharge states satisfying the amount of power required by the whole load 110, from the charge and discharge capacity of the storage battery assembly 104, and transmits, as the total charge and discharge control command S1, the obtained charge and discharge states to the master controller 22.

In the total charge and discharge control command S1, the charge and discharge condition is represented by a power amount and time, for example, in such a manner that "charging is to be performed at XX kW for YY seconds." In addition, when the charge upper limit voltage is specified, the charge and discharge condition may be represented such that "charging is to be performed at XX kW until the voltage reaches ZZ V," or when the discharge lower limit voltage is specified, the charge and discharge condition may be represented such that "discharging is to be performed until the voltage reaches ZZ V," or the charging and discharging may be commanded by specifying the SOC. Here, within the practical use range of power, the SOC (charging degree) is set to 100 in the maximum storage state and to zero in the minimum storage state, and hence, on the basis of this range, the SOC (charging degree) represents, in percentage, a charging degree in each power storage state.

Further, when the voltage of the storage battery assembly 104 reaches the discharge lower limit voltage at the time of discharging, or when the voltage of the storage battery assembly 104 reaches the charge upper limit voltage at the time of charging, the total charge and discharge control command S1 is set to indicate, for example, that "charging or discharging is to be temporarily interrupted (or is to be performed at 0 kW)."

The total charge and discharge control command S1 is transmitted irregularly as required. Therefore, there may be a case where the total charge and discharge control command S1 is not transmitted for a significantly long time. In such case, the master controller 22, which receives the total charge and discharge control command S1, may be unable to determine whether the system controller 20 is active in the operating state, or is inactive in the non-operating state. To cope with this, a check signal S2 for checking whether or not the system controller 20 is in the operating state is transmitted from the master controller 22 to the system controller 20 in a suitable period. The system controller 20 answers with a response signal when being in the operating state. When the response signal is returned from the system controller 20, the master controller 22 can determine that the system controller 20 is in the operating state, and when no response signal is returned from the system controller 20, the master controller 22 can determine that the system controller 20 is in the non-operating state. The suitable period may be set to, for example, 10 minutes.

The master controller 22 is a control apparatus having functions of receiving the total charge and discharge control command S1 from the system controller 20, and transmitting, to the power converter management section 26, an assembly charge and discharge control command S5 for each of the power converters 28.

The master controller 22 receives power converter management data S4 as the state data of the power converters 28 from the power converter management section 26, and receives the unit state data S3 representing the state of each of the storage battery units 40 from the sub-controller 24 provided in each of the storage battery units 40 included in the storage battery assembly 104. On the basis of the received unit state data S3, the master controller 22 transmits, to the power converter management section 26, the assembly charge and discharge control command S5, including one of a start instruction command for commanding the start of each of the power converters 28, a standby instruction command for commanding a temporary interruption of each of the power converters 28, and a stop instruction command for commanding the stop of each of the power converters 28. Further the assembly charge and discharge control command S5 includes, as required, a target charge and discharge power used for controlling the charging and discharging of each of the power converters 28. Further, on the basis of the power converter management data S4 and the unit state data S3, the master controller 22 determines whether or not the total charge and discharge control command S1 transmitted from the system controller 20 can be executed. Then, on the basis of the determination result, the master controller 22 transmits the assembly charge and discharge control command S5 to the power converter management section 26. This determination can be performed, for example, by applying the unit state data S3, and the like, to a conditional expression defined beforehand. When the total charge and discharge control command S1 cannot be executed due to limitation in the capability of the power converters, limitation for safety, and the like, the master controller 22 transmits the assembly charge and discharge control command S5 to the power converter management section 26 with the charge and discharge amount suppressed to an achievable level. Alternatively, the master controller 22 may perform control not to transmit the assembly charge and discharge control command S5. Further, when the total charge and discharge control command S1 cannot be executed as is, the master controller 22 may transmit the result to the storage battery power management apparatus 12.

The transmission and reception of the assembly charge and discharge control command S5 are executed in a period of 100 ms, and the transmission and reception of the power converter management data S4 and the unit state data S3 are performed in a period of, for example, one second. The specific charge and discharge management processing of the master controller 22 will be described below.

The total charge and discharge control command S1 is a command value which represents the total charge and discharge amount of the storage battery assembly 104 and is transmitted to the master controller 22. The assembly charge and discharge control command S5 is set by dividing the command value of the total charge and discharge control command S1 into values respectively corresponding to the power converters 28. As shown in FIG. 2, when eight power converters 28 are provided for the power converter management section 26, and when the total charge and discharge control command S1 indicates that "discharging is to be performed at 320 kW for 1800 seconds," the assembly charge and discharge control command S5 is set to indicate that "the first power converter 28 is to perform discharging at 40 kW, the second power converter 28 is to perform discharging at 40 kW, . . . the eighth power converter 28 is to perform discharging at 40 kW." Note that, in this specific example, each of the command values of the assembly charge and discharge control command S5 is set to a value obtained when the command value of the total charge and discharge control command S1 is equally divided by the number of the power converters 28, but there is also a case where the command values of the assembly charge and discharge control command S5 are respectively set to other values. For example, in cases such as when the power converter management data S4 indicate that a trouble is caused in one of the power converters 28 controlled by the power converter management section 26, and ??when none of the storage battery control units 42 is connected to the corresponding power converter 28??one or more of the storage battery control units 42 is not connected to the corresponding power converter 28?? due to opened and closed conditions, a trouble, and the like, of the selection switch SW1, the assembly charge and discharge control command S5 indicating a limited charge and discharge amount in part of the total charge and discharge control command S1 is transmitted to the power converter management section 26. Specifically, according to the number of the storage battery control units 42 connected to the power converters 28 other than the power converter 28 in which the trouble is caused, the master controller 22 generates the assembly charge and discharge control command S5 for controlling each of the power converters 28 so as to satisfy the charge and discharge state required by the total charge and discharge control command S1, and outputs the assembly charge and discharge control command S5 to the power converter management section 26.

Further, the master controller 22 transmits to the storage battery power management apparatus 12, as the power converter management data S7, the data having the same contents as the contents of the power converter management data S4 received from the power converter management section 26. The master controller 22 performs mainly the monitoring and control of charging and discharging in a short period (for example, about one second), and hence the storage battery power management apparatus 12 and the total power monitoring apparatus 14 may perform management and monitoring in a longer period. Therefore, in order to reduce the processing load or the communication load of the storage battery power management apparatus 12 and that of the total power monitoring apparatus 14, the power converter management data S7 may be transmitted in a period longer than the transmission period of the power converter management data S4. For example, when the power converter management data S4 is transmitted every second, the power converter management data S7 may be transmitted every ten seconds.

In this case, the information of the power converter management data S4 transmitted by ten transmission operations is included in the power converter management data S7. Of course, the power converter management data S7 may be transmitted in a period other than this period, and the transmission periods of the power converter management data S4 and the power converter management data S7 may also be set to the same period. In the present embodiment, the power converter management data S7 are indirectly transmitted from the power converter management section 26 to the power management apparatus 110*a* including the storage battery power management apparatus 12 via the master controller 22, but may also be transmitted directly from the power converter management section 26 to the power management apparatus 110*a* including the storage battery power management apparatus 12.

The sub-controller 24 is provided in each of the storage battery units 40, and controls opening and closing of the switches included in the switch circuit 30 provided in each of the storage battery units 40, according to the state of each of the storage battery units 40. Note that, as will be described below, it is preferred that, when the opening and closing control of the switches included in the switch circuit 30 is made different between charging and discharging, the information representing which of the charging processing or the discharging processing is to be performed is transmitted from the master controller 22 to the sub-controller 24. Thereby, the sub-controller 24 can independently perform opening and closing control of the switches of the switch circuit 30 in an order suitable for each of the charging processing and the discharging processing.

When the power supply (not shown) of the sub-controller 24 is turned on, the sub-controller 24 closes the unit switches SW3 and SW4 of the switch circuit 30 shown in FIG. 4, so as to connect the storage battery unit 40 to the power converter 28. Note that the unit switches SW3 and SW4 may be closed at a timing after the storage battery control unit 42 is connected to the parallel connection line L1 as described below.

Here, the sub-controller 24 determines the state of the storage battery units 40 on the basis of the current value detected by the storage battery current sensor 52 provided in each of the storage battery units 40, the voltage value detected by the storage battery voltage sensor 54 provided in each of the storage battery units 40, and the temperature detected by the temperature sensor 56 provided in each of the storage battery units 40. When a trouble is caused in the state of the storage battery unit 40, the sub-controller 24 opens the unit switches SW3 and SW4 of the switch circuit 30, so as to disconnect the connection between the storage battery unit 40 and the power converter 28.

Further, the sub-controller 24 determines the states of the storage battery pack 44 and the storage battery control unit 42 on the basis of the current value detected by the storage battery current sensor 52 provided in each of the storage battery units 40, the voltage value detected by the storage battery voltage sensor 54 provided in each of the storage battery units 40, the temperature detected by the temperature sensor 56 provided in each of the storage battery units 40, and the reference voltage detected by a parallel connection line voltage sensor 60 provided in the parallel connection line L1. According to the determination result, the sub-controller 24 performs opening and closing control of the selection switches SW1 (SW1 (1) to SW1 (4)) respectively corresponding to the storage battery control units 42.

For example, the sub-controller 24 determines whether or not a trouble is caused in the states of the storage battery pack 44 and the storage battery control unit 42, on the basis of the current value detected by the storage battery current sensor 52 provided in each of the storage battery units 40, the voltage value detected by the storage battery voltage sensor 54 provided in each of the storage battery units 40, the temperature detected by the temperature sensor 56 provided in each of the storage battery units 40, and the reference voltage detected by the parallel connection line voltage sensor 60 provided at the parallel connection line L1. When determining that a trouble is caused, the sub-controller 24 performs processing to disconnect, from the parallel connection line L1, the storage battery control unit 42 including the storage battery pack 44 in which the trouble is caused. Specifically, the sub-controller 24 opens the selection switch SW1 (SW1 (1) to SW1 (4)) corresponding to the storage battery control unit 42 including the storage battery pack 44 in which the trouble is caused. Further, the sub-controller 24 transmits, as the unit state data S3 and S6, the information representing the trouble of the storage battery pack 44 and the storage battery control unit 42, to the master controller 22 and the storage battery power management apparatus 12.

The occurrence of a trouble can be determined by comparing the detected values with predefined conditions; that is, can be determined in cases such as when the current detected by the storage battery current sensor 52 is outside a threshold range calculated from a conditional expression defined beforehand, when the cell voltage detected by the storage battery voltage sensor 54 is outside a threshold range defined beforehand, and when the pack temperature detected by the temperature sensor 56 is outside a threshold range defined beforehand.

Further, at the time of start of charging and discharging of the storage battery assembly 104, the sub-controller 24 performs opening and closing control of the selection switches SW1 (SW1 (1) to SW1 (4)) respectively corresponding to the storage battery control units 42, on the basis of the voltage value detected for each of the storage battery control units 42 by the storage battery voltage sensor 54. This processing will be described below.

Further, as described above, the sub-controller 24 transmits, as the unit state data S3 and S6, the information representing the trouble of the storage battery unit 40 to the master controller 22 and the storage battery power management apparatus 12.

Here, the unit state data S6 may be transmitted in a period longer than the transmission period of the unit state data S3. The reason why the unit state data S6 is transmitted in a period longer than the transmission period of the unit state data S3 is to reduce the processing load or the communication load of the storage battery power management apparatus 12 and that of the total power monitoring apparatus 14. For example, when the unit state data S3 are transmitted every second, the unit state data S6 need only to be transmitted every ten seconds. In this case, the information of the unit state data S3 transmitted by ten transmission operations is included in the unit state data S6.

Of course, the unit state data S6 may be transmitted in a period other than this period, and the transmission period of the unit state data S6 and the transmission period of the unit state data S3 may also be set to the same period. In the present embodiment, the unit state data S6 is directly transmitted from the sub-controller 24 to the power management apparatus 110a including the storage battery power management apparatus 12, but may also be indirectly transmitted from the sub-controller 24 to the power management apparatus 110a including the storage battery power management apparatus 12 via the master controller 22.

The power converter management section 26 receives the assembly charge and discharge control command S5 from the master controller 22, so as to control each of the power converters 28 to be controlled. As shown in FIG. 2, in the power supply system 100 of the present embodiment, the number of the power converters 28 to be controlled by the power converter management section 26 is set to eight. However, the number of the power converters 28 is not limited to this, and may be suitably changed. The management processing of the power converters 28 performed in the power converter management section 26 will be described below.

The power converter 28 has functions, such as a function of performing power conversion between AC power of the system power supply 108 and DC power of the storage battery assembly 104, a function of performing voltage conversion between DC voltage of the solar battery system 106 and DC voltage of the storage battery assembly 104, a function of performing power conversion between DC power of the storage battery assembly 104 and AC power of the load 110, and a function of performing voltage conversion between DC voltage of the storage battery assembly 104 and DC voltage of the load 110. Specifically, the power converter 28 is configured by including a bidirectional DC/AC conversion circuit, and a bidirectional voltage conversion circuit as required.

When, in accordance with the assembly charge and discharge control command S5, charging is performed from the solar battery system 106 and the system power supply 108 to the storage battery assembly 104, or discharging is performed from the storage battery assembly 104 to the load 110, the power converter management section 26 controls the power conversion and the voltage conversion in each of the power converters 28. Further, when a trouble is caused in one of the power converters 28 controlled by the power converter management section 26, and when a command for inhibiting the charging and discharging or a standby command is outputted from the master controller 22, the power converter management section 26 brings the power converter 28 having the trouble into a standby state, and transmits, as the power converter management data S4, the information representing the trouble of the power converter 28 to the master controller 22.

For example, as shown in FIG. 2, when eight power converters 28 are provided, and when the assembly charge and discharge control command S5 indicates that "discharging is to be performed at 40 kW in the first power converter 28, discharging is to be performed at 40 kW in the second power converter 28, . . . discharging is to be performed at 40 kW in the eighth power converter 28," the power converter management section 26 controls voltage conversion and power conversion in each of the power converters 28 so that power of 40 kW is supplied to the load 110 from each of the power converters 28. Further, when the assembly charge and discharge control command S5 indicates that "charging is to be performed at 40 kW in the first power converter 28, charging is to be performed at 40 kW in the second power converter 28, . . . charging is to be performed at 40 kW in the eighth power converter 28, the power converter management section 26 controls voltage conversion and power conversion in each of the power converters 28 so that the charging is performed at 40 kW via each of the power converters 28 from the solar battery system 106 and the system power supply 108.

Figure 8:
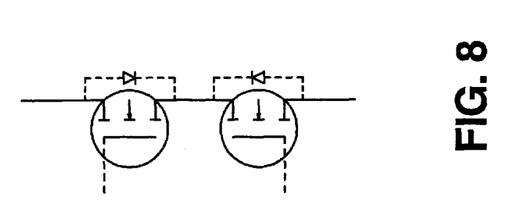
FIG. 8 is a view showing the configuration of a switch in the embodiment of the present invention.

In the above description, each of the selection switch SW1, the switch SW2, and the unit switches SW3 and SW4 is illustrated as one FET transistor in FIG. 4, but it is preferred that, as shown in FIG. 8, two FET transistors are connected in series so that parasitic diodes are connected reversely in series. In this case, the opening and closing control is performed so that the two FET transistors connected in series are opened and closed at the same time. In this configuration of the switches, the parasitic diodes can prevent current unexpectedly flowing in spite of the state where the FET transistors are opened.

As described above, the system controller 20 obtains the charge and discharge state of the whole storage battery assembly 104, which state satisfies the power amount required by the whole load 110, and generates the total charge and discharge control command S1 on the basis of the obtained state. Then, in consideration of the power converter 28 and the storage battery unit 40 in which a trouble is caused, the master controller 22 generates the assembly charge and discharge control command S5 for specific control of each of the power converters 28 so as to satisfy the charge and discharge control command in the total charge and discharge control command S1. Further, the power converter management section 26 of a lower hierarchical order than the master controller 22 controls each of the power converters 28. At this time, the power converter management section 26 performs processing to disconnect the power converter 28 and the storage battery unit 40 connected to the power converter 28, without depending on the direct control by the system controller 20 and the master controller 22, each of which has a higher hierarchical order than the power converter management section 26. Further, the sub-controller 24 controls the connection and disconnection of the storage battery control unit 42 included in each of the storage battery units 40, without depending on the direct control by the system controller 20 and the master controller 22, each of which has a higher hierarchical order than the sub-controller 24. Even in the case where a trouble is caused in a part of the power converters 28 and the storage battery units 40, when the hierarchical control is performed in this way, the system controller 20 can handle the storage battery assembly 104 as if it were one battery. Further, the hierarchical control reduces the processing burden of the control system of a higher hierarchical order, and makes it possible to flexibly cope with a change in the system configuration.

The power supply system 100 is configured to prevent the case that, when a plurality of the storage battery control units 42 are connected in parallel so as to be charged and discharged, a large charging and discharging current flows between the storage battery control units 42 on the basis of the output voltage of each of the storage battery control units 42.

<Basic Operation at the Time of Charge and Discharge>

In the following, the basic processing at the time when charging and discharging are performed in the storage battery assembly 104 will be described below. The basic processing at the time of charging and discharging is performed according to the flow chart shown in FIG. 5. In the following description, it is assumed that, in the initial state, the power supplies of all of the storage battery units 40 included in the storage battery assembly 104 are opened, and that the selection switches SW1, the switch SW2, and the unit switches SW3 and SW4 included in each of the storage battery units 40 are opened.

Figure 5:
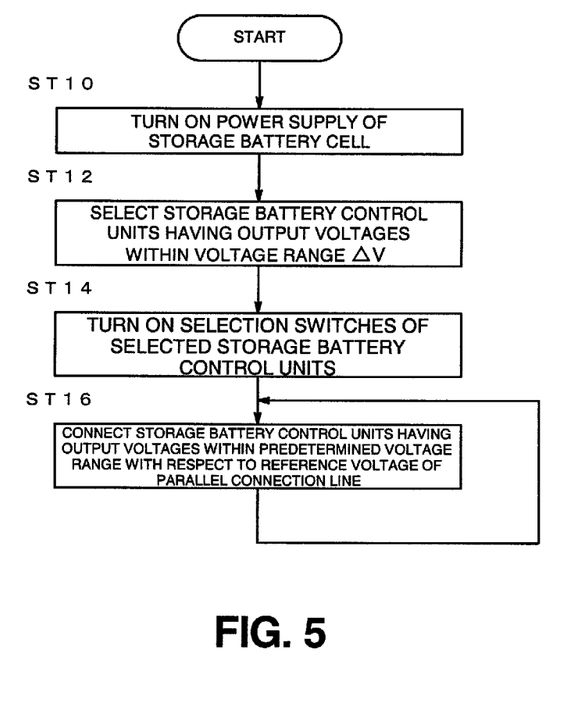
FIG. 5 is a flow chart showing basic processing performed at the time of charging and discharging.

In the following description, the voltage detected by each of the storage battery voltage sensors 54 is described as the output voltage detected for each of the storage battery control units 42. Of course, it is also possible to use a value obtained by summing the output voltages of the storage battery packs 44 configuring each of the storage battery control units 42, or to use a value obtained by summing the output voltage detected from each parallel assembly of the storage battery cells 46. In the following description, an example is described in which the detected output voltage of each of the storage battery control units 42 is used as is, but the open circuit output voltage of each of the storage battery control units 42 is preferably used for accurate control of the connection of the storage battery unit 40. The open circuit output voltage means the output voltage of the storage battery control unit 42 in the case where the influence of the voltage drop or the voltage rise, which is caused by the internal resistance included in the storage battery control unit 42 and by the current flowing through the storage battery control unit 42, is eliminated. The internal resistance included in the storage battery control unit 42 is changed in a predetermined relationship with the temperature, the current value, and the like. Therefore, the voltage drop or the voltage rise caused by the internal resistance can be estimated by the detected values, such as the voltage value of the storage battery control unit 42, which voltage value is detected by the storage battery voltage sensor 54, and the current value of the storage battery control unit 42, which current value is detected by the storage battery current sensor 52, and the temperature detected by the temperature sensor 56. Therefore, the open circuit output voltage can be calculated for each of the storage battery control units 42.

In step ST10, the power supplies of the storage battery units 40 included in the storage battery assembly 104 are turned on (that is, the sub-controller 24 and the switch circuit 30 of the storage battery unit 40 are brought into an operating state). Here, the power supplies of all the storage battery units 40 included in the storage battery assembly 104 are turned on. The sub-controller 24 of the storage battery unit 40, in which the power supply is turned on, closes the unit switches SW3 and SW4 included in the storage battery unit 40, so that the storage battery unit 40 is connected to the power converter 28. Note that the unit switches SW3 and SW4 may be closed at a timing after the storage battery control units 42 are connected to the parallel connection line L1 as described below.

In step ST12, each of the sub-controllers 24 acquires the voltage value detected by the storage battery voltage sensor 54 provided in each of the storage battery control units 42, and obtains the output voltage of each of the storage battery control units 42. The sub-controller 24 incorporates the output voltage of each of the storage battery control units 42 into the unit state data S3 and outputs the unit state data S3 to the master controller 22.

The master controller 22 receives the unit state data S3 from each of the storage battery units 40, and counts, for each of the power converters 28, the number of the storage battery control units 42 whose output voltage is within a predetermined voltage range $\Delta V$. Here, the master controller 22 successively changes the connection candidate voltage used as a reference of the voltage range $\Delta V$ so as to maximize the number of the storage battery control units 42 having output voltages within the fixed voltage range $\Delta V$, and selects the storage battery control units 42 as a group.

Figure 6:
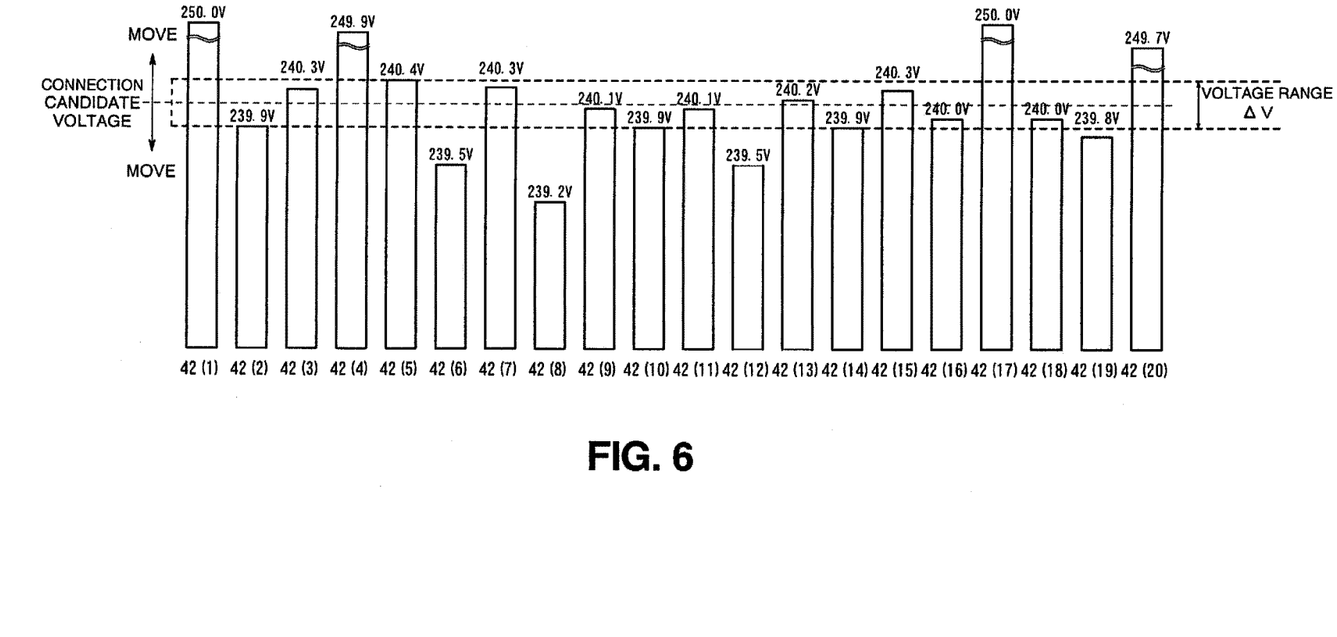
FIG. 6 is a view for explaining the basic processing performed at the time of charging and discharging.

For example, when the output voltages of twenty storage battery control units 42, which may be connected to one power converter 28, are obtained as shown in FIG. 6, and when the voltage range $\Delta V$ is set to 0.5 V, the master controller 22 operates as follows. The master controller 22 sets the connection candidate voltage to the middle value of the voltage range $\Delta V$, and changes the connection candidate voltage while maintaining the fixed voltage range $\Delta V$. Then, the master controller 22 selects the storage battery control units 42 by selecting the connection candidate voltage so as to maximize the number of the storage battery control units 42 whose output voltages are within the voltage range $\Delta V$. In the example of FIG. 6, when the connection candidate voltage is set to 240.15 V, and when the voltage range $\Delta V$ is set to a range of 239.9 V to 240.4 V, the number of the storage battery control units 42 having output voltages within the voltage range $\Delta V$ is maximized. Therefore, the master controller 22 selects the storage battery control units 42 having output voltages within this voltage range $\Delta V$. Such processing is performed for each of the power converters 28.

Here, it is preferred that, when there are a plurality of connection candidate voltages each of which maximizes the number of storage battery control units 42 having output voltages within the voltage range $\Delta V$, the master controller 22 selects the storage battery control units 42 having output voltages within the voltage range $\Delta V$ enabling the connection candidate voltage to be as high as possible at the time of discharging, and selects storage battery control units 42 having output voltages within the voltage range $\Delta V$ enabling the connection candidate voltage to be as low as possible at the time of charging.

For example, when the voltage range $\Delta V$ is set to 0.5 V, and when the number of the storage battery control units 42 having output voltages within the voltage range of 239.9 V to 240.4 V (corresponding to the connection candidate voltage of 240.15 V), and the number of the storage battery control units 42 having output voltages within the voltage range of 220.0 V to 220.5 V (corresponding to the connection candidate voltage of 220.25 V) are equally maximized, it is preferred that the master controller 22 selects, at the time of discharging, the storage battery control units 42 having output voltages within the voltage range of 239.9 V to 240.4 V, and selects, at the time of charging, the storage battery control units 42 having output voltages within the voltage range of 220.0 V to 220.5 V.

In step ST14, the processing for connecting the selected storage battery control units 42 to each of the power converters 28 is performed. The master controller 22 outputs a switch control signal S10 for closing the selection switch SW1 corresponding to the selected storage battery control units 42, to the sub-controller 24 of the storage battery unit 40 including the storage battery control units 42 selected in step ST12.

Each of the sub-controllers 24 receives the switch control signal S10 and performs control to close the selection switch SW1 which is commanded to be closed by the switch control signal S10.

Thereby, the difference between the output voltages of the storage battery control units 42 first connected to each of the power converter 28 via the parallel connection line L1 is within the voltage range ΔV. As a result, it is possible to prevent the case that, when charging and discharging are performed via the parallel connection line L1, excessive charging and discharging current flows between the storage battery control units 42 connected in parallel by the parallel connection line L1. Therefore, it is possible to suppress performance deterioration of the storage battery due to the excessive charging and discharging.

Further, in the present embodiment, more than a predetermined number of the storage battery control units 42 having output voltages within the voltage range ΔV are determined by majority decision, and hence the number of storage battery control units 42 first connected to each of the power converters 28 via the parallel connection line L1 can be maximized. Therefore, even when the required discharging power from the load 110, and the required charging power from the solar battery system 106 and the system power supply 108 are comparatively large, it is possible to distribute the charging and discharging load which is imposed on each of the storage battery control units 42.

When the number of the storage battery control units 42 which can be connected to the power converter 28 is small, a reduction in the charging and discharging power may be required. However, in the present embodiment, the number of the storage battery control units 42, which can be used for charging and discharging, can be maximized by determining, by majority decision, the storage battery control units 42 having output voltages within the voltage range ΔV, and hence the limitation on the charging and discharging power can be suppressed.

In step ST16, on the basis of the difference between the reference voltage of the parallel connection line L1 and the output voltage of the storage battery control unit 42 which is not yet connected to the parallel connection line L1, the opening and closing control of the selection switch SW1 corresponding to the storage battery control unit 42 is performed.

This processing is performed on the basis of the difference between the reference voltage set to the voltage of the parallel connection line L1 connected to each of the power converters 28, and the output voltage of each of the storage battery control units 42 included in the storage battery unit 40 connected to the parallel connection line L1.

Figure 7:
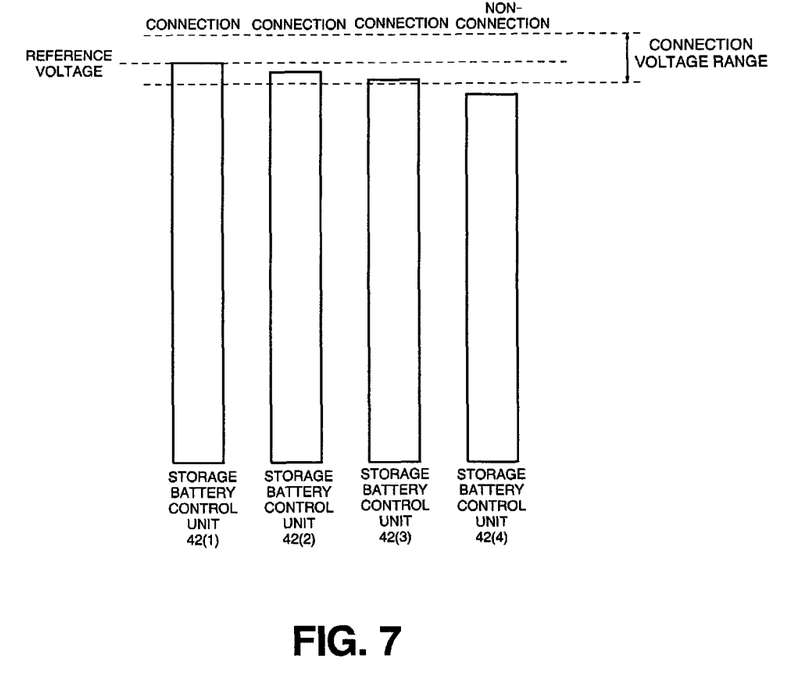
FIG. 7 is a view for explaining the basic processing performed at the time of charging and discharging.

The sub-controller 24 outputs, to the master controller 22, the unit state data S3 including the voltage value detected by the storage battery voltage sensor 54 provided in the storage battery control unit 42, and the reference voltage detected by the parallel connection line voltage sensor 60 provided in the parallel connection line L1 connected to the storage battery control units 42. When receiving the unit state data S3, the master controller 22 determines whether or not the difference (voltage value difference) between the output voltage of each of the storage battery control units 42 and the reference voltage of the parallel connection line L1 connected to each of the storage battery control units 42 is within a predetermined connection voltage range. As shown in FIG. 7, the master controller 22 selects the storage battery control unit 42 which has the voltage value difference within the connection voltage range, and which is not yet connected to the parallel connection line L1, and outputs, to each of the sub-controllers 24, the switch control signal S10 for closing on the selection switch SW1 corresponding to the selected storage battery control unit 42. Each of the sub-controllers 24 closes the selection switch SW1 specified by the switch control signal S10.

Here, it is preferred that, when a plurality of the storage battery control units 42 are connected to the common parallel connection line L1, the connection voltage range is set to a value at which the current flowing between the plurality of storage battery control units 42 does not exert a large adverse effect on the storage battery control units 42. For example, when the connection voltage range is ±5 V, the selection switch SW1 corresponding to the storage battery control unit 42 having the voltage value difference within the voltage range of ±5 V is closed, so that the storage battery control unit 42 is connected to the parallel connection line L1.

The processing in step ST16 is performed by the sub-controller 24 as required while the charging and discharging between the storage battery assembly 104 and the load 110 is performed. That is, when the discharging from the storage battery control units 42 connected to the parallel connection line L1 to the load 110 is performed, and when the output voltage of the storage battery control units 42 is thereby reduced, the reference voltage of the parallel connection line L1 is reduced in response to the reduction in the output voltage of the storage battery control units 42. Therefore, the selection switch SW1 corresponding to the storage battery control unit 42 having the voltage value difference which is newly determined to be within the connection voltage range based on the reference voltage is closed. Similarly, when the charging is performed to the storage battery control units 42 respectively connected to the parallel connection line L1 from the solar battery system 106 and the system power supply 108, and when the output voltage of the storage battery control units 42 is thereby increased, the reference voltage of the parallel connection line L1 is increased in response to the increase in the output voltage of the storage battery control units 42. Therefore, the selection switch SW1 corresponding to the storage battery control unit 42 having the voltage value difference which is newly determined to be within the connection voltage range based on the reference voltage is closed.

Further, the charging and discharging is performed between the respective storage battery control units 42 via the resistors R included in the switch circuit 30. This also reduces the difference between the output voltages of the storage battery control units 42, and hence the selection switch SW1 corresponding to the storage battery control unit 42 having the voltage value difference which is newly determined to be within the connection voltage range is turned on as required.

In this way, when only the storage battery control units 42 whose output voltages are within the connection voltage range based on the reference voltage of the parallel connection line L1 are connected to the parallel connection line L1, excessive charging and discharging currents can be prevented from flowing between the storage battery control units 42, and thereby performance deterioration of the storage battery can be prevented.

In the present embodiment, the storage battery control units 42 are selected by selecting the connection candidate voltage so as to maximize the number of storage battery control units 42 having output voltages within the voltage range ΔV. However, the storage battery control units 42 may also be selected by selecting the connection candidate voltage so that the number of the storage battery control units 42 having output voltages within the voltage range ΔV is not less than a predetermined number. It is preferred that the predetermined number is set so that the predetermined number of storage battery control units 42 can correspond to the required charging and discharging power when they are connected in parallel. The permissible charging and discharging current is determined for each of the storage battery control units 42, and hence whether or not the selected storage battery control units 42 can correspond to the required charging and discharging power is determined by the number of the selected storage battery control units 42.

When there are a plurality of connection candidate voltages at which the number of the storage battery control units 42 having output voltages within the voltage range ΔV is not less than the predetermined number, it is preferred that, at the time of discharging, the storage battery control units 42 having output voltages within the voltage range ΔV are selected so as to increase the connection candidate voltage as much as possible, and that, at the time of charging, the storage battery control units 42 having output voltages within the voltage range ΔV are selected so as to decrease the connection candidate voltage as much as possible.

As described above, the required number of the storage battery control units 42 can be connected to the power converter 28 from the beginning depending on the required charging and discharging power, and also the charging states of the storage batteries can be made uniform more quickly in such a manner that, at the time of discharging, the storage battery control units 42 are discharged in order from higher to lower output voltage, and that, at the time of charging, the storage battery control units 42 are charged in order from lower to higher output voltage.

Further, whether the storage battery control units 42 are selected to maximize the number of the storage battery control units 42 having output voltages within the voltage range ΔV, or the storage battery control units 42 are selected so that the number of the storage battery control units 42 having output voltages within the voltage range ΔV is not less than the predetermined number can be determined on the basis of the amount of required discharging power from the load 110, and on the basis of the amount of required charging power from the power supply. The master controller 22 receives the total charge and discharge control command S1 from the system controller 20. When the total charge and discharge control command S1 indicates that the required power to be discharged to the load 110 is not less than predetermined reference power, or that the required power to be charged to the storage battery assembly 104 from the solar battery system 106 and the system power supply 108 is not less than predetermined reference power, the master controller 22 selects the storage battery control units 42 so as to maximize the number of storage battery control units 42 having output voltages within the voltage range ΔV. On the other hand, when the total charge and discharge control command S1 indicates that the required power to be discharged to the load 110 is less than the predetermined reference power, or that the required power to be charged to the storage battery assembly 104 from the solar battery system 106 and the system power supply 108 is less than the predetermined reference power, the master controller 22 selects the storage battery control units 42 so that the number of storage battery control units 42 having output voltages within the voltage range ΔV is not less than the predetermined number.

<Modification of Processing at the Time of Charging and Discharging>

In the basic processing of charging and discharging, after the sub-controller 24 receives the switch control signal S10 from the master controller 22, the sub-controller 24 turns on the power supplies of the storage battery units 40, and selects, by changing the connection candidate voltage, the storage battery control units 42 so that the number of storage battery control units 42 having output voltages within the voltage range ΔV is maximized or not less than the predetermined number.

In the present modification, the sub-controller 24 periodically transmits beforehand, to the master controller 22, the unit state data S3 representing the state of each of the storage battery units 40. At this time, it is preferred that the master controller 22 stores beforehand the value of the connection candidate voltage of each of the power converters 28, and counts beforehand the number of the storage battery control units 42 which can be connected to each of the power converters 28 at the connection candidate voltage. With this configuration, after receiving the total charge and discharge control command S1 from the system controller 20, the master controller 22 can quickly generate the switch control signal S10 for performing, via the sub-controller 24, opening and closing control of the switches included in the switch circuit 30. Thereby, the master controller 22 can quickly correspond to the total charge and discharge control command S1, and also connects the required number of storage battery control units 42 to the power converter 28 from the beginning depending on required charging power. Further, the master controller 22 can more quickly make uniform the charging state of the storage batteries in such a manner that the storage battery control units 42 are discharged in order from higher to lower output voltage at the time of discharging, and that the storage battery control units 42 are charged in order from lower to higher output voltage at the time of charging.

REFERENCE SYMBOL LIST

10 Load power management apparatus
12 Storage battery power management apparatus
14 Total power monitoring apparatus
20 System controller
22 Master controller
24 Sub-controller
26 Power converter management section
28 Power converter
30 Switch circuit
40 Storage battery unit
42 Storage battery control unit
44 Storage battery pack
46 Storage battery cell
52 Storage battery current sensor
54 Storage battery voltage sensor
56 Temperature sensor
60 Parallel connection line voltage sensor
100 Power supply system
102 Power supply management system
104 Storage battery assembly
106 Solar battery system
108 System power supply
110 Load
110a Power management apparatus

The invention claimed is:

1. A power supply system comprising:
a storage battery assembly comprising a plurality of storage battery control units;
wherein each storage battery control unit comprises at least one storage battery cell and is connected to a common parallel connection line via a selection switch circuit, wherein
a reference voltage range is set, which is defined by a reference voltage value and a span of voltage from the reference voltage value;
a group of the storage battery control units, which are selected from the storage battery control units and have output voltages within the reference voltage range, are first connected to the parallel connection line, and
the reference voltage range is set by changing the reference voltage value so as to maximize the number of the storage battery control units having output voltages within the reference voltage range.

2. The power supply system according to claim 1, wherein
when the amount of required discharging power from the storage battery assembly is not less than a reference value, the group of the storage battery control units, which have output voltages within a voltage range that is set to maximize the number of the storage battery control units having output voltages within the voltage range, are first connected to the parallel connection line, and
when the amount of required discharging power from the storage battery assembly is less than the reference value, the group of the storage battery control units, which have output voltages within a voltage range that is set to allow the number of the storage battery control units having output voltages within the voltage range to be equal to or more than a required number, are first connected to the parallel connection line.

3. The power supply system according to claim 1, wherein
when the amount of required charging power from the storage battery assembly is not less than a reference value, the group of the storage battery control units, which have output voltages within a voltage range that is set to maximize the number of the storage battery control units having output voltages within the voltage range, are first connected to the parallel connection line, and
when the amount of required charging power from the storage battery assembly is less than the reference value, the group of the storage battery control units, which have output voltages within a voltage range that is set to allow the number of the storage battery control units having output voltages within the voltage range to be equal to or more than a required number, are first connected to the parallel connection line.

4. The power supply system according to claim 2, wherein
when the discharging of the storage battery assembly is performed, the voltage range allowing the number of the storage battery control units having output voltages within the voltage range to be equal to or more than a predetermined number is set to include a highest output voltage of the storage battery control unit.

5. The power supply system according to claim 3, wherein
when the charging of the storage battery assembly is performed, the voltage range allowing the number of the storage battery control units having output voltages within the voltage range to be equal to or more than a predetermined number is set to include a lowest output voltage of the storage battery control unit.

6. A power supply system comprising:
a storage battery assembly comprising a plurality of storage battery control units;
wherein each storage battery control unit comprises at least one storage battery cell and is connected to a common parallel connection line via a selection switch circuit, wherein
a reference voltage range is set, which is defined by a reference voltage value and a span of voltage from the reference voltage value;
a group of the storage battery control units, which are selected from the storage battery control units and have output voltages within the reference voltage range, are first connected to the parallel connection line, and
the reference voltage range is set by changing the reference voltage value so that the number of the storage battery control units having output voltages within the reference voltage range is not less than a predetermined minimum number.

7. A method for controlling a power supply system comprising a storage battery assembly comprising a plurality of storage battery control units, wherein each storage battery control unit comprises at least one storage battery cell and is connected to a common parallel connection line via a selection switch circuit, the method comprising:
setting a reference voltage range, the reference voltage range being defined by a reference voltage value and a span of voltage from the reference voltage value;
measuring output voltages of the plurality of storage battery units;
setting the reference voltage value such that a number of battery units having output voltages within reference voltage range is maximized or not less than a predetermined minimum number; and
first connecting the storage battery units having output voltages within the predetermined range to the parallel connection line.

* * * * *